(12) United States Patent
Li

(10) Patent No.: US 8,717,937 B2
(45) Date of Patent: May 6, 2014

(54) METHOD AND APPARATUS FOR ACQUIRING NETWORK CONFIGURATION INFORMATION

(75) Inventor: Feiyun Li, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 49 days.

(21) Appl. No.: 13/400,989

(22) Filed: Feb. 21, 2012

(65) Prior Publication Data

US 2012/0188908 A1   Jul. 26, 2012

Related U.S. Application Data

(63) Continuation of application No. PCT/CN2010/075539, filed on Jul. 29, 2010.

(30) Foreign Application Priority Data

Aug. 20, 2009   (CN) .......................... 2009 1 0091040

(51) Int. Cl.
*H04W 16/24*   (2009.01)

(52) U.S. Cl.
USPC ........................... 370/254; 370/252; 370/401

(58) Field of Classification Search
USPC .......................................................... 370/254
See application file for complete search history.

(56) References Cited

U.S. PATENT DOCUMENTS 6,028,848 A * 2/2000 Bhatia et al. .................. 370/257
6,130,892 A * 10/2000 Short et al. .................... 370/401
6,678,734 B1 * 1/2004 Haatainen et al. ............ 709/230
6,892,229 B1 * 5/2005 Karadogan et al. ........... 709/220
7,099,338 B1 * 8/2006 Lee ............................... 370/401

(Continued)

FOREIGN PATENT DOCUMENTS

CN   1744596 A   3/2006
CN   1 909 469 A   2/2007

(Continued)

OTHER PUBLICATIONS

Rejection Decision, mailed Aug. 23, 2011, issued in related Chinese Application No. 200910091040.0, Huawei Technologies Co., Ltd.

(Continued)

*Primary Examiner* — Ian N Moore
*Assistant Examiner* — Lakeram Jangbahadur
(74) *Attorney, Agent, or Firm* — Leydig, Voit & Mayer, Ltd.

(57) ABSTRACT

A method and an apparatus for acquiring network configuration information are disclosed. The method includes: when a terminal device dials up and needs to carry out network data services, delivering, by a NDIS driver layer of the terminal device, a Query Network Configuration Information message to a wireless modem; and acquiring, by the NDIS driver layer, the network configuration information returned from the wireless modem, and providing an application layer of the terminal device with the acquired network configuration information. In this way, when the terminal device does not provide the function of a DHCP client, the terminal device can effectively acquire needed network configuration information to implement dial-up successfully, and can carry out network data services online, so as to ensure that normal services can be carried out on the terminal device.

6 Claims, 5 Drawing Sheets

(56) References Cited

U.S. PATENT DOCUMENTS

| | | | |
|---|---|---|---|
| 7,599,393 B1* | 10/2009 | Ho | 370/465 |
| 7,664,857 B2* | 2/2010 | Ovsiannikov et al. | 709/225 |
| 8,078,721 B2* | 12/2011 | Droms et al. | 709/224 |
| 8,285,855 B2* | 10/2012 | Lyndersay et al. | 709/228 |
| 2003/0120818 A1* | 6/2003 | Ho | 709/250 |
| 2005/0089024 A1* | 4/2005 | Bergeron et al. | 370/352 |
| 2005/0265257 A1* | 12/2005 | Masuda | 370/254 |
| 2008/0060066 A1* | 3/2008 | Wynn et al. | 726/6 |
| 2009/0287800 A1* | 11/2009 | Chi et al. | 709/220 |

FOREIGN PATENT DOCUMENTS

| | | | |
|---|---|---|---|
| CN | 101257496 A | | 9/2008 |
| CN | 101 640 923 A | | 2/2010 |
| EP | 0 964 546 A2 | | 12/1999 |
| JP | 07-262117 A | | 10/1995 |
| JP | 11 275 102 A | | 10/1999 |
| JP | 2005086282 A | | 3/2005 |
| JP | 2005341287 A | | 12/2005 |
| JP | 2007096956 A | | 4/2007 |
| KR | 100 635 130 B1 | | 10/2006 |
| WO | WO 03/055179 A2 | | 7/2003 |
| WO | WO 2011/020400 A1 | | 2/2011 |

OTHER PUBLICATIONS

International Search Report for International Application No. PCT/CN2010/075539, mailed Nov. 11, 2010, Huawei Technologies Co., Ltd.

Written Opinion of the International Searching Authority (translation) dated (mailed) Nov. 11, 2010, issued in related Application No. PCT/CN2010/075539, filed Jul. 29, 2010, Huawei Technologies Co., Ltd.

Office Action dated Mar. 23, 2011, issued in related Chinese application No. 200910091040.0, Huawei Technologies Co., Ltd.

Search Report dated Aug. 20, 2009, issued in related Chinese Application No. 200910091040.0, Huawei Technologies Co., Ltd.

Extended European Search Report in corresponding European Patent Application No. 10809533.2 (Oct. 25, 2012).

Moore, Terry, "Advances in USB Technology for Wireless Products," XP55035490, Jul. 23, 2009, Expo Comm/Wireless, Tokyo, Japan.

1st Office Action in corresponding European Patent Application No. 10809533.2 (Sep. 3, 2013).

Perkins et al., "The Point-to-Point (PPP) Initial Configuration Options," Network Working Group Memo, Internet Engineering Task Force (Jul. 1990).

1st Office Action in corresponding Japanese Patent Application No. 2012-525037 (May 21, 2013).

* cited by examiner

METHOD AND APPARATUS FOR ACQUIRING NETWORK CONFIGURATION INFORMATION

CROSS-REFERENCE TO RELATED APPLICATIONS

This application is a continuation of International Application No. PCT/CN2010/075539, filed on Jul. 29, 2010, which claims priority to Chinese Patent Application No. 200910091040.0, filed on Aug. 20, 2009, both of which are hereby incorporated by reference in their entireties.

FIELD OF THE INVENTION

The present invention relates to the network communication field, and in particular, to a method and an apparatus for acquiring network configuration information.

BACKGROUND OF THE INVENTION

Currently, when a terminal device carries out network data services, after the dial-up Packet Data Protocol (PDP, Packet Data Protocol) context is activated, that is, after a data service connection is set up, the terminal device needs to acquire corresponding network configuration information, namely, IP address information and gateway information. Then, the terminal device sets the IP address, so that the dial-up succeeds, which guarantees the implementation of network data services. The foregoing terminal device may be a personal computer (PC) or any other computer processing device.

In the prior art, static network configuration information may be set manually or the network configuration information may be acquired dynamically. In the prior art, the network configuration information is acquired dynamically through a Dynamic Host Configuration Protocol client (DHCP Client, Dynamic Host Configuration Protocol Client). FIG. 1 is a schematic diagram of a signaling interaction in which the network configuration information is acquired dynamically through the DHCP client in the prior art. As shown in FIG. 1, after the terminal device initiates a dial-up operation, the DHCP client on the terminal device sets up a connection with the modem (modem); the modem initiates an Activate PDP request (that is, a data service call) to the network; after the network responds successfully (that is, after the data service call is set up successfully), it returns corresponding network configuration information, that is, IP address information and gateway information, to the modem; after the terminal device receives an ACK signal sent from the modem, the DHCP client delivers a DHCP Query request to the modem; the modem returns, to the terminal device, the network configuration information allocated by the network; when the terminal device confirms that the received network configuration information is correct and available, the terminal device sets the IP address properly. The dial-up process is complete, and the terminal device can start to perform corresponding network data services.

According to the solution in the prior art, the current solution of acquiring network configuration information is implemented on the basis that the terminal device can provide the DHCP client function. If the terminal device cannot provide the DHCP client function or disables corresponding DHCP client function, the terminal device cannot dial up successfully and can only set up a connection at most. Thus, the terminal device cannot carry out network data services online, and normal services on the terminal device are affected.

SUMMARY OF THE INVENTION

Embodiments of the present invention provide a method and an apparatus for acquiring network configuration information, so that when a terminal device does not provide the function of a DHCP client, the terminal device can effectively acquire network configuration information to implement dial-up successfully. In addition, the terminal device can carry out network data services online, which ensures that normal services can be carried out on the terminal device.

An embodiment of the present invention provides a method for acquiring network configuration information, where the method includes:

when a terminal device dials up and needs to carry out network data services, delivering, by a Network Driver Interface Standard (Network Driver Interface Standard, NDIS) driver layer of the terminal device, a Query Network Configuration Information message to a wireless modem; and acquiring, by the NDIS driver layer, network configuration information returned by the wireless modem, and providing an application layer of the terminal device with the acquired network configuration information.

An embodiment of the present invention provides an apparatus for acquiring network configuration information, where the apparatus includes:

a message delivering unit, disposed at a Network Driver Interface Standard NDIS driver layer of a terminal device and configured to deliver a Query Network Configuration Information message to a wireless modem when the terminal device dials up and needs to carry out network data services; and an information acquiring unit, disposed at the Network Driver Interface Standard NDIS driver layer of the terminal device and configured to acquire network configuration information returned by the wireless modem, and provide an application layer of the terminal device with the acquired network configuration information.

According to the foregoing technical solutions, when a terminal device dials up and needs to carry out data services, a Network Driver Interface Standard (Network Driver Interface Standard, NDIS) driver layer of the terminal device may deliver a Query Network Configuration Information message to the wireless modem; the NDIS driver layer acquires the network configuration information returned from the wireless modem, and provides an application layer of the terminal device with the acquired network configuration information. In this way, when the terminal device does not provide the function of the DHCP client, the terminal device can effectively acquire needed network configuration information to implement dial-up successfully. In addition, the terminal device can perform network data services online, which ensures that normal services can be carried out on the terminal device.

DETAILED DESCRIPTION OF THE EMBODIMENTS

Embodiments of the present invention provide a method and an apparatus for acquiring network configuration information. When a terminal device does not provide the function of a DHCP client, if the terminal device needs to implement dial-up to carry out network data services, an NDIS driver layer of the terminal device may deliver a Query Network Configuration Information command to a wireless modem (modem), where the network configuration information may be information such as IP address information and gateway configuration information; after the wireless modem receives the query command, the wireless modem may return corresponding network configuration information to the NDIS driver layer of the terminal device according to the query command; the terminal device completes the setting of corresponding IP address and gateway according to the acquired network configuration information, and implements dial-up successfully, so as to ensure that normal services can be carried out on the terminal device.

Embodiment 1

Figure 1:
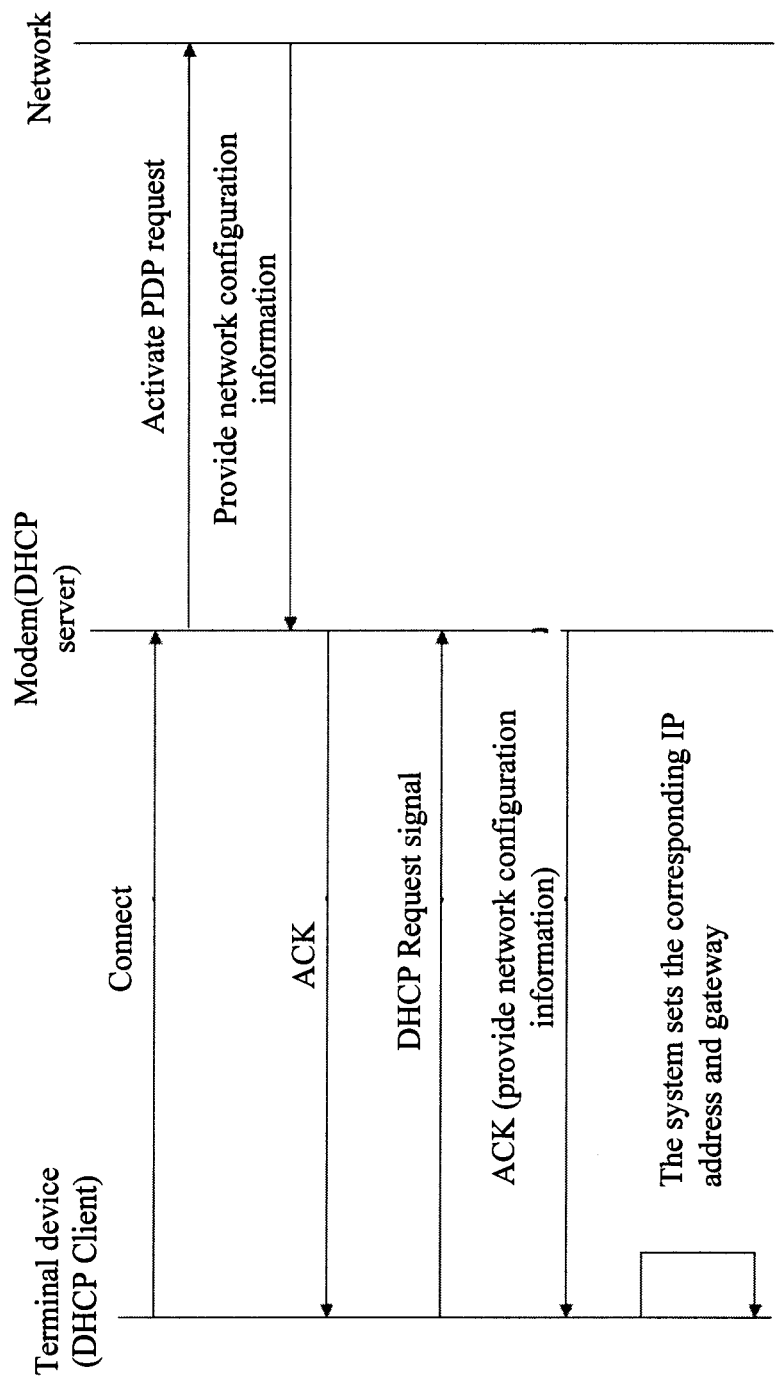
FIG. 1 is a schematic diagram of a signaling interaction in which network configuration information is acquired dynamically through a DCHP client in the prior art.
Figure 2:
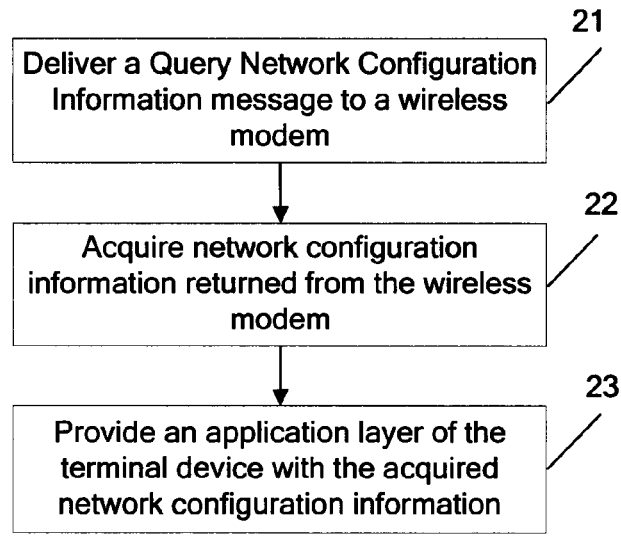
FIG. 2 is a flow chart schematic of a method according to Embodiment 1 of the present invention.

To better illustrate the embodiment of the present invention, the specific embodiment of the present invention is described with reference to accompanying drawings. FIG. 2 is a flow chart schematic of a method according to Embodiment 1 of the present invention. The method includes the following steps:

Step 21: Deliver a Query Network Configuration Information message to a wireless modem.

In step 21, when a terminal device dials up and needs to carry out network data services, a Network Driver Interface Standard NDIS driver layer of the terminal device may deliver a Query Network Configuration Information message to a wireless modem.

In the specific implementation process, when the terminal device dials up, the terminal device may first set up a connection with the wireless modem; the wireless modem may send an Activate PDP request to a network; after the activation is performed successfully, the network returns corresponding network configuration information to the wireless modem; the wireless modem returns a corresponding ACK signal to the terminal device again. At this time, the Network Driver Interface Standard NDIS driver layer of the terminal device may deliver the Query Network Configuration Information message to the wireless modem.

The Query Network Configuration Information message may be delivered to the wireless modem via an NDIS port by using modem command language (that is, an AT command), or may be delivered to the wireless modem via a serial port by using modem command language, or may be delivered to the wireless modem via an NDIS port by using NDIS command language (that is, a customized command).

Step 22: Acquire network configuration information returned from the wireless modem.

In step 22, after the wireless modem receives the Query Network Configuration Information message sent from the NDIS driver layer, the wireless modem may transmit, to the NDIS driver layer, the network configuration information acquired by the wireless modem from the network. In this way, the NDIS driver layer in the terminal device can acquire the network configuration information returned by the wireless modem.

In the specific implementation process, the way that the wireless modem transmits the network configuration information to the NDIS driver layer depends on the way that the wireless modem receives query request information. That is, if the Query Network Configuration Information message is delivered via the NDIS port by using the modem command language, the wireless modem may return the network configuration information to the NDIS driver layer of the terminal device via the NDIS port; if the Query Network Configuration Information message is delivered via the serial port by using the modem command language, the wireless modem may return the network configuration information to the NDIS driver layer via the serial port; if the Query Network Configuration Information message is delivered via the NDIS port by using the NDIS command language, the wireless modem may return the network configuration information to the NDIS driver layer of the terminal device via the NDIS port.

Step 23: Provide an application layer of the terminal device with the acquired network configuration information.

In step 23, after the NDIS driver layer of the terminal device acquires the network configuration information returned from the wireless modem, the acquired network configuration information may be provided to the application layer of the terminal device so as to perform a subsequent configuration operation.

After the application layer of the terminal device receives the network configuration information, the configuration of a network address may be completed by using the acquired network configuration information, and dial-up is implemented successfully so as to carry out network data services.

In the specific implementation process, when the terminal device invokes the wireless wide area network application programming interface (WWAN API) to operate the wireless modem, the wireless modem may be a wireless wide area network device (WWAN device).

Through the implementation of the technical solution provided in Embodiment 1, when the terminal device does not provide the function of the DHCP client, the terminal device can effectively acquire needed network configuration information to implement dial-up successfully, and can carry out network data services online so as to ensure that normal services can be carried out on the terminal device.

Embodiment 2

Figure 3:
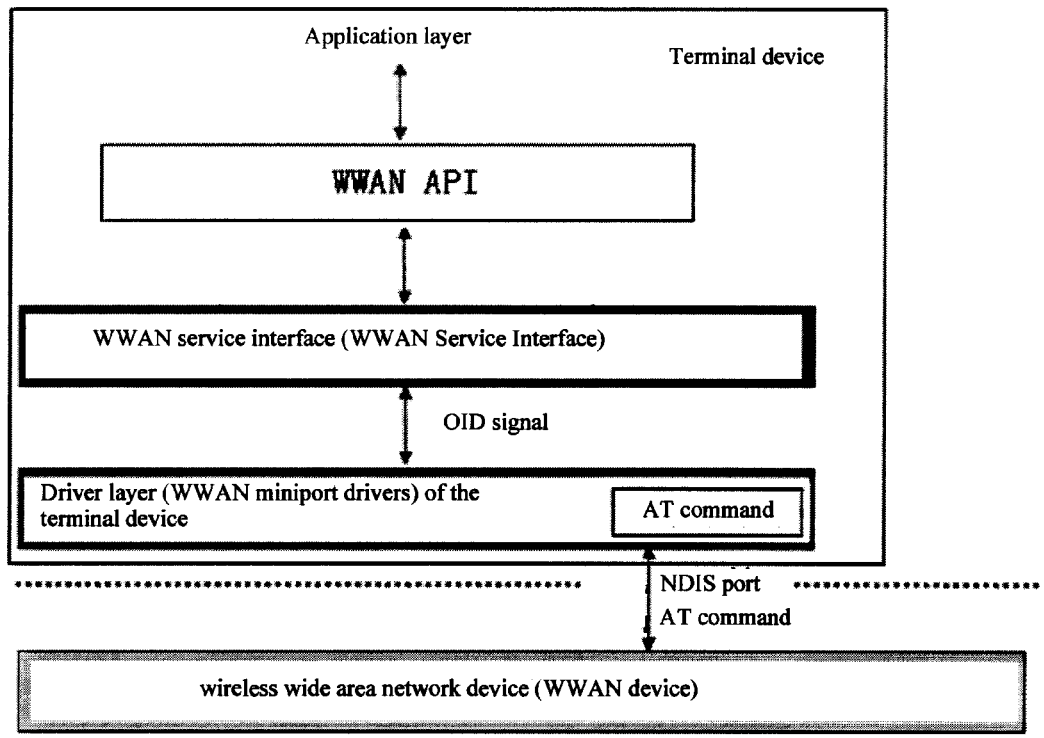
FIG. 3 is a schematic diagram of a signaling interaction in a specific instance according to Embodiment 2 of the present invention.

FIG. 3 is a schematic diagram of a signaling interaction in a specific instance according to Embodiment 2 of the present invention. As shown in FIG. 3, when a terminal device invokes a wireless wide area network application programming interface (WWAN API, Wireless Wide Area Network Application Programming Interface), the API may invoke a wireless wide area network service interface (WWAN Service Interface), and the terminal device delivers an object identifier (OID, Object Identifier) signal to a driver layer; according to different OID signals delivered from an upper layer, the driver layer (WWAN miniport drivers) implements, through one or multiple modem commands (AT command), a function required by the OID signal for implementation. For example, a dial-up OID may be converted into an ATD dial-up AT command at a driver layer, then the driver layer delivers the AT command to a wireless wide area network device (WWAN device) via an NDIS port so as to implement the interaction between the terminal device and the wireless wide area network device, where the wireless wide area network device corresponds to the wireless modem in the method provided in Embodiment 1.

Then, after PDP is activated (that is, after a data service connection is set up), the driver layer (WWAN miniport drivers) receives an ACK signal sent from the WWAN device; the driver layer may deliver an Acquire Network Configuration Information request to the WWAN device via the NDIS port by using the AT command; the WWAN device returns a processing result of the AT command to the driver layer (WWAN miniport drivers) via the NDIS port; the driver layer provides an application layer of the terminal device with returned network configuration information to complete the setting of the network address.

Through the implementation of the technical solution provided in Embodiment 2, when the terminal device does not provide the function of the DHCP client, the terminal device can effectively acquire needed network configuration information to implement dial-up successfully, and can carry out network data services online, so as to ensure that normal services can be carried out on the terminal device. In addition, the message interaction is completed by using the AT command and the NDIS port flexibly, and the AT command can be transmitted without adding a special port, so as to save port resources and facilitate the information transfer.

Embodiment 3

Figure 4:
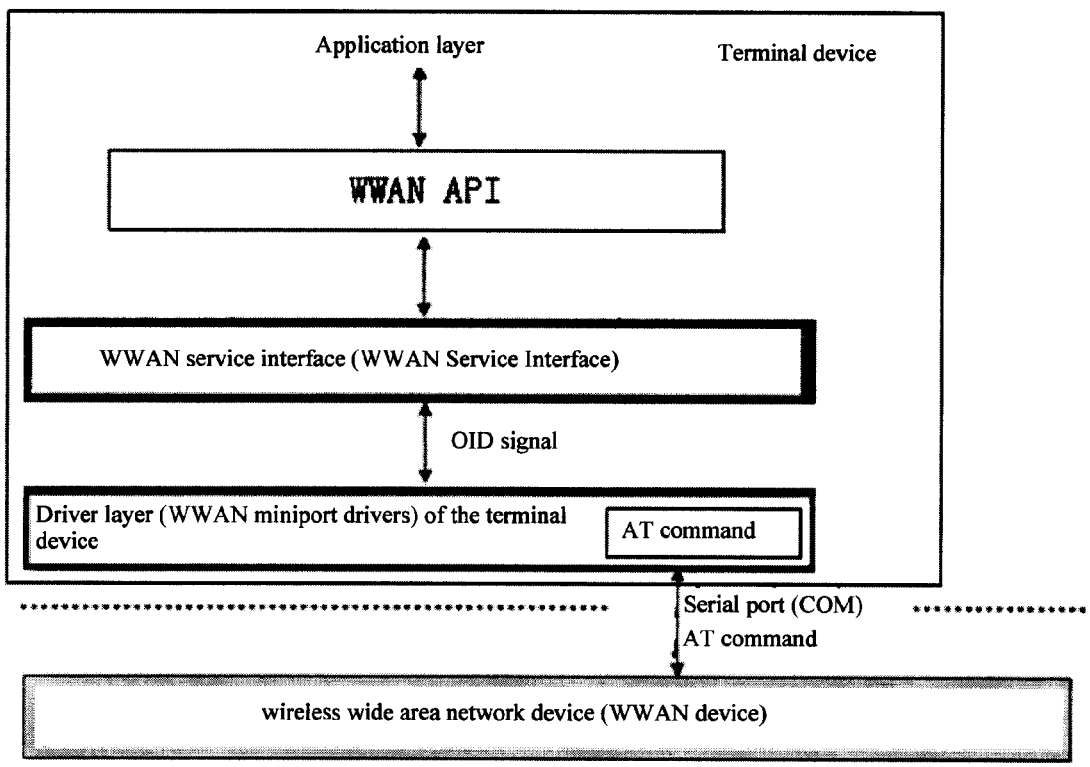
FIG. 4 is a schematic diagram of a signaling interaction in another specific instance according to Embodiment 3 of the present invention.

FIG. 4 is a schematic diagram of a signaling interaction in another specific instance according to Embodiment 3 of the present invention. As shown in FIG. 4, a driver layer of a terminal device sends a Query Network Configuration Information message to a WWAN device via a serial port so as to complete the interaction between the terminal device and the WWAN device. After PDP is activated, the driver layer delivers an Acquire Network Configuration Information request automatically if the driver layer receives an ACK signal sent from the WWAN device, where the Acquire Network Configuration Information request is sent to the WWAN device via a serial port by using an AT command; the WWAN device may return a processing result of the AT command to the driver layer via the serial port; the driver layer provides an application layer of the terminal device with returned network configuration information to complete the setting of a network address.

Similarly, through the implementation of the technical solution provided in Embodiment 3, when the terminal device does not provide the function of the DHCP client, the terminal device can effectively acquire needed network configuration information to implement dial-up successfully, and can carry out network data services online, so as to ensure that normal services can be carried out on the terminal device. In addition, the message interaction is completed by using the AT command and the serial port flexibly, and the AT command can be transmitted without adding a special port, so as to save port resources and facilitates the information transfer.

Embodiment 4

Figure 5:
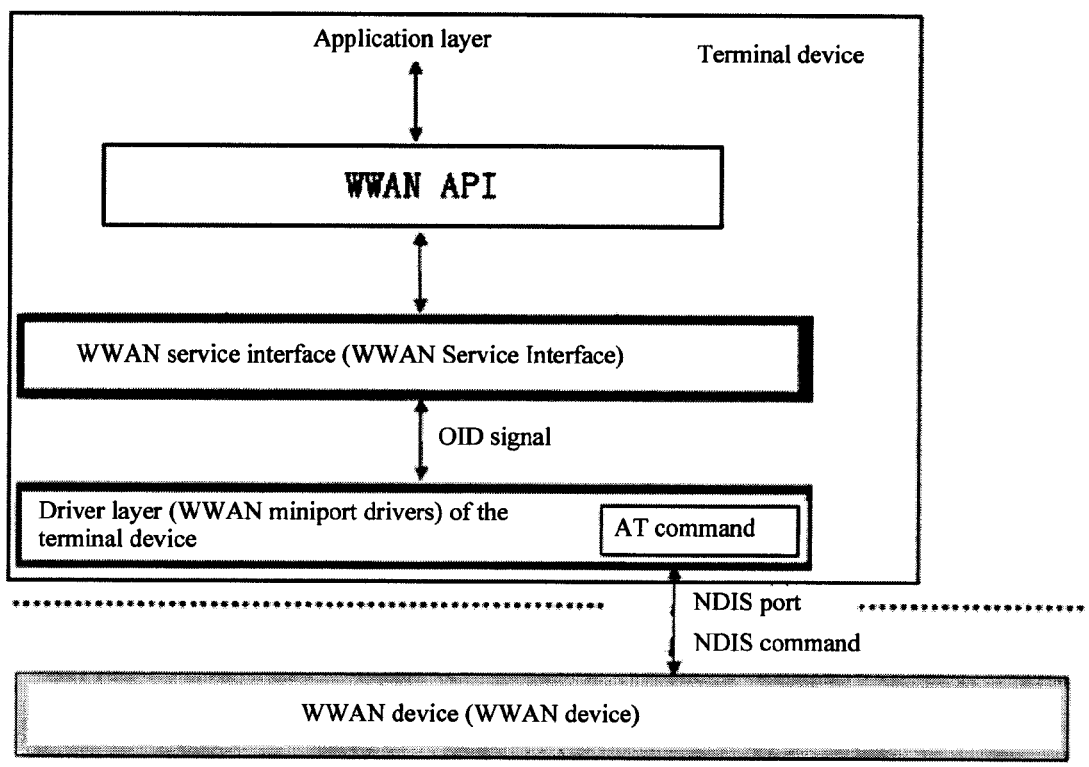
FIG. 5 is a schematic diagram of a signaling interaction in another specific instance according to Embodiment 4 of the present invention.

FIG. 5 is a schematic diagram of a signaling interaction in another specific instance according to Embodiment 4 of the present invention. As shown in FIG. 5, a driver layer of a terminal device converts a function, which is required by an OID signal for implementation, into an NDIS command. Because a WWAN device is a device complying with the NDIS, the driver layer can deliver an NDIS command via an NDIS port without special processing. In this way, after PDP is activated, the driver layer may deliver an Acquire Network Configuration Information request automatically to a WWAN device if the driver layer receives an ACK signal sent from the WWAN device, where the Acquire Network Configuration Information request is delivered to the WWAN device via the NDIS port by using an NDIS command; the WWAN device returns a processing result of the NDIS command to the driver layer via the NDIS port; the driver layer provides an application layer of the terminal device with returned network configuration information to complete the setting of a network address.

Similarly, through the implementation of the technical solution provided in Embodiment 4, when the terminal device does not provide the function of the DHCP client, the terminal device can effectively acquire needed network configuration information to implement dial-up successfully, and can carry out network data services online, so as to ensure that normal services can be carried out on the terminal device. In addition, the message interaction is completed by using the NDIS command and the NDIS port flexibly, and the AT command can be transmitted without adding a special port, so as to save port resources and facilitates the information transfer.

Embodiment 5

Figure 6:
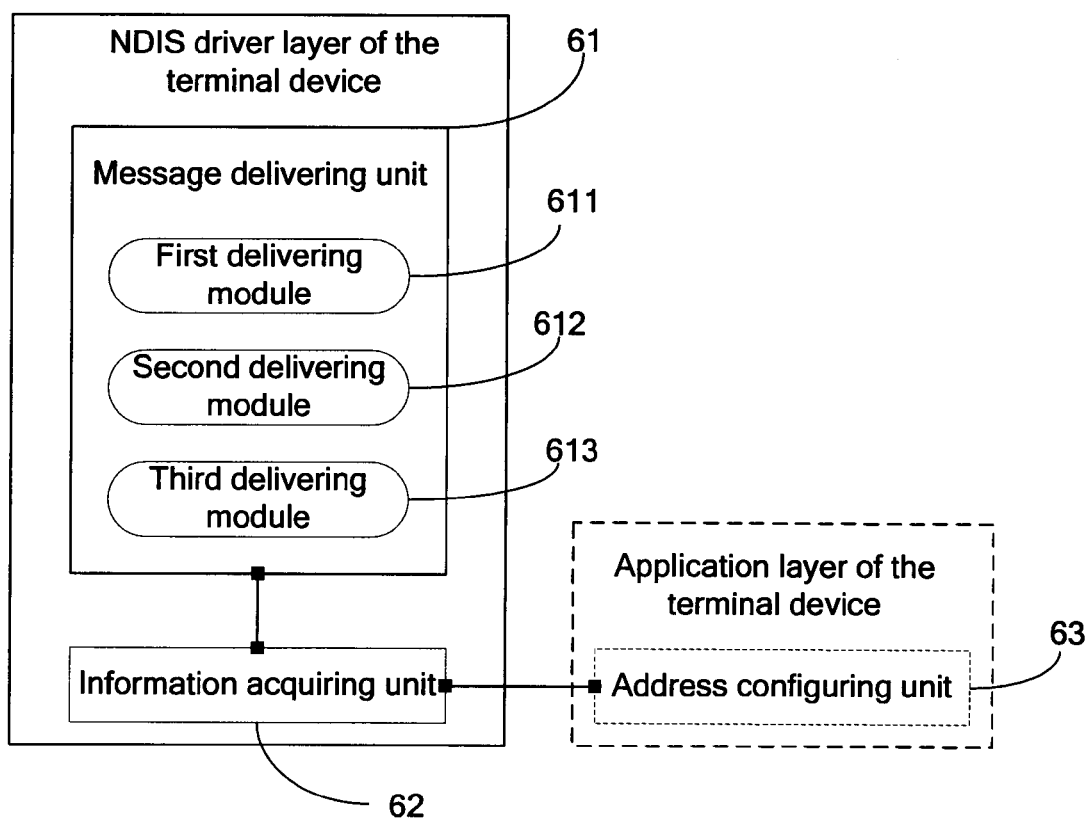
FIG. 6 is a schematic structural diagram of an apparatus according to Embodiment 5 of the present invention.

Embodiment 5 of the present invention provides an apparatus for acquiring network configuration information. FIG. 6 is a schematic structural diagram of the apparatus provided in Embodiment 5. The apparatus includes a message delivering unit 61 and an information acquiring unit 62.

The message delivering unit 61 is disposed at a Network Driver Interface Standard NDIS driver layer of a terminal device, and is configured to deliver a Query Network Configuration Information message to a wireless modem when the terminal device dials up and needs to carry out network data services. The specific mode of sending a query message refers to the method provided in Embodiment 1 of the present invention.

The information acquiring unit 62 is disposed at the Network Driver Interface Standard NDIS driver layer of the terminal device, and is configured to acquire network configuration information returned by the wireless modem, and provide an application layer of the terminal device with the acquired network configuration information.

In addition, the message delivering unit 61 may include:

a first delivering module 611, configured to deliver the Query Network Configuration Information message to the wireless modem via an NDIS port by using modem command language; and/or a second delivering module 612, configured to deliver the Query Network Configuration Information message to the wireless modem via a serial port by using modem command language; and/or a third delivering module 613, configured to deliver the Query Network Configuration Information message to the wireless modem via an NDIS port by using NDIS command language.

In addition, the apparatus may further include an address configuring unit 63. The address configuring unit 63 is disposed at the application layer of the terminal device and is configured to complete network address configuration by using the acquired network configuration information.

The foregoing apparatus for acquiring network configuration information is disposed in the terminal device.

It should be noted that, in the preceding apparatus embodiment, units that are included are divided only according to function logics. However, the division is not limited thereto as long as the units can implement corresponding functions. In addition, each functional unit is named for the purpose of differentiation only, and specific names are not intended to limit the protection scope of the present invention.

Persons of ordinary skills in the art should understand that all or part of the steps in the methods provided in the preceding embodiments may be performed by a program instructing relevant hardware. The program may be stored in a computer readable storage medium, such as a read-only memory/random access memory (ROM/RAM), a magnetic disk, and a CD-ROM.

In conclusion, according to the embodiments of the present invention, when the terminal device does not provide the function of the DHCP client, the terminal device can effectively acquire needed network configuration information to implement dial-up successfully, and can carry out network data services online, so as to ensure that normal services can be carried out on the terminal device.

Detailed above are merely exemplary embodiments of the present invention; however the protection scope of the present invention is not limited thereto. Any modification or replacement readily derived by those skilled in the art without departing from the technical scope disclosed in the present invention should fall within the protection scope of the present invention. Therefore, the protection scope of the present invention is subject to the appended claims.

What is claimed is:

1. A method for acquiring network configuration information, comprising:
when a terminal device, which does not provide a function of a DHCP client or disable a function of a DHCP client dials up and needs to carry out network data services, delivering, by a Network Driver Interface Standard NDIS driver layer of the terminal device, a Query Network Configuration Information message to a wireless modem to query for network configuration information wherein the network configuration information comprises IP address information and gateway information; and
acquiring, by the NDIS driver layer, network configuration information returned by the wireless modem, and providing an application layer of the terminal device with the acquired network configuration information;
wherein the Query Network Configuration Information message is delivered to the wireless modem via the NDIS port by using NDIS command language;
wherein after providing the application layer of the terminal device with the acquired network configuration information, the method further comprises:
completing, by the application layer of the terminal device, network address configuration by using the acquired network configuration information.

2. The method according to claim 1, wherein the Query Network Configuration Information message is delivered to the wireless modem via an NDIS port by using modem command language.

3. The method according to claim 1, wherein the Query Network Configuration Information message is delivered to the wireless modem via a serial port by using modem command language.

4. The method according to claim 1, wherein when the terminal device invokes a wireless wide area network application programming interface, the wireless modem is a wireless wide area network device.

5. An apparatus for acquiring network configuration information, comprising:
a message delivering unit, disposed at a Network Driver Interface Standard NDIS driver layer of a terminal device, which does not provide a function of a DHCP client or disable a function of a DHCP client and configured to deliver a Query Network Configuration Information message to a wireless modem to query for a network configuration information when the terminal device dials up and needs to carry out network data services wherein the network configuration information comprises IP address information and gateway information; and
an information acquiring unit, disposed at the Network Driver Interface Standard NDIS driver layer of the terminal device and configured to acquire network configuration information returned by the wireless modem, and provide an application layer of the terminal device with the acquired network configuration information;
wherein the message delivering unit comprises at least one of the following modules:
a first delivering module, configured to deliver the Query Network Configuration Information message to the wireless modem via an NDIS port by using modem command language;
a second delivering module, configured to deliver the Query Network Configuration Information message to the wireless modem via a serial port by using modem command language; and
a third delivering module, configured to deliver the Query Network Configuration Information message to the wireless modem via the NDIS port by using NDIS command language;
wherein the apparatus, further comprising:
an address configuring unit, disposed at the application layer of the terminal device and configured to complete network address configuration by using the acquired network configuration information.

6. The apparatus according to claim 5, wherein the apparatus is disposed in the terminal device.

* * * * *